(12) United States Patent
Stockhammer et al.

(10) Patent No.: US 11,381,867 B2
(45) Date of Patent: Jul. 5, 2022

(54) MULTIPLE DECODER INTERFACE FOR STREAMED MEDIA DATA

(71) Applicant: QUALCOMM Incorporated, San Diego, CA (US)

(72) Inventors: Thomas Stockhammer, Bergen (DE); Muhammed Zeyd Coban, Carlsbad, CA (US); Zhen Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/736,610

(22) Filed: Jan. 7, 2020

(65) Prior Publication Data

US 2020/0221159 A1 Jul. 9, 2020

Related U.S. Application Data

(60) Provisional application No. 62/789,940, filed on Jan. 8, 2019.

(51) Int. Cl.
*H04N 7/173* (2011.01)
*H04N 21/43* (2011.01)
(Continued)

(52) U.S. Cl.
CPC ......... *H04N 21/4302* (2013.01); *G06F 9/542* (2013.01); *H04N 19/70* (2014.11);
(Continued)

(58) Field of Classification Search
CPC .. H04N 21/4302; H04N 19/70; H04N 21/439; H04N 21/4405; G06F 9/542
See application file for complete search history.

(56) References Cited

U.S. PATENT DOCUMENTS 6,038,256 A 3/2000 Linzer et al.
6,795,506 B1 9/2004 Zhang et al.
(Continued)

FOREIGN PATENT DOCUMENTS

WO 2018005835 A1 1/2018

OTHER PUBLICATIONS

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.
(Continued)

*Primary Examiner* — Kyu Chae
(74) *Attorney, Agent, or Firm* — Campbell C. Chiang; Shumaker & Sieffert, P.A.

(57) ABSTRACT

An example client device for retrieving media data includes a memory configured to store media data; and one or more processors implemented in circuitry and configured to execute a plurality of video decoders; determine a complexity value for the media data including a plurality of encoded video streams, the complexity value representing complexity of an aggregation of the encoded video streams; retrieve the media data including the encoded video streams in response to determining that the client device is capable of decoding the encoded video streams using the complexity value; and distribute the encoded video streams and synchronization information to corresponding video decoders of the plurality of video decoders to cause the video decoders to decode the corresponding video streams and to output decoded video data from the video streams in a synchronized fashion.

33 Claims, 13 Drawing Sheets

(51) Int. Cl.
  *H04N 21/4405* (2011.01)
  *G06F 9/54* (2006.01)
  *H04N 19/70* (2014.01)
  *H04N 21/439* (2011.01)

(52) U.S. Cl.
  CPC ..... *H04N 21/439* (2013.01); *H04N 21/43072* (2020.08); *H04N 21/4405* (2013.01)

(56) References Cited

U.S. PATENT DOCUMENTS

| | | | |
|---|---|---|---|
| 7,096,271 | B1 | 8/2006 | Omoigui et al. |
| 8,208,794 | B2 | 6/2012 | Kobayashi et al. |
| 8,249,414 | B2 | 8/2012 | Ackley et al. |
| 8,331,769 | B2 | 12/2012 | Okada et al. |
| 9,942,575 | B1 | 4/2018 | Lothian et al. |
| 2002/0131496 | A1* | 9/2002 | Vasudevan ......... H04N 21/6582 375/240.11 |
| 2008/0152020 | A1* | 6/2008 | Kayashima .......... H04N 21/242 375/240.28 |
| 2009/0086095 | A1* | 4/2009 | Boger ...................... G09G 5/00 348/473 |
| 2012/0013746 | A1 | 1/2012 | Chen et al. |
| 2012/0023249 | A1 | 1/2012 | Chen et al. |
| 2012/0042050 | A1 | 2/2012 | Chen et al. |
| 2013/0202051 | A1* | 8/2013 | Zhou .................... H04N 19/436 375/240.26 |
| 2014/0010282 | A1 | 1/2014 | He et al. |
| 2015/0003515 | A1 | 1/2015 | Normile et al. |
| 2015/0264373 | A1* | 9/2015 | Wang .................. H04N 19/156 375/240.25 |
| 2016/0261665 | A1 | 9/2016 | Stockhammer et al. |
| 2016/0301960 | A1* | 10/2016 | Sze ...................... H04N 21/222 |
| 2017/0055007 | A1 | 2/2017 | Phillips et al. |
| 2017/0063960 | A1 | 3/2017 | Stockhammer et al. |
| 2018/0242028 | A1 | 8/2018 | Van et al. |
| 2019/0018471 | A1* | 1/2019 | Chen ........................ G06F 9/54 |
| 2019/0109884 | A1* | 4/2019 | Karapantelakis ... H04W 52/386 |
| 2020/0053392 | A1 | 2/2020 | Hannuksela |
| 2020/0374505 | A1 | 11/2020 | Kammachi Sreedhar et al. |
| 2021/0203973 | A1 | 7/2021 | Skupin et al. |

OTHER PUBLICATIONS

Fielding, et al., "Hypertext Transfer Protocol-HTTP/1.1", 114 Pages, Jun. 1999, pp. 130-132.

International Search Report and Written Opinion—PCT/US2020/012774—ISAEPO—dated Apr. 14, 2020.

ISO: "Information Technology—Coded Representation of Immersive Media—Part 3: Versatile video coding", ISO/IEC JTC 1/SC 29 /WG 11 N18692, ISO/IEC CD 23090-3, Jul. 12, 2019, 446 Pages.

ISO: "Information Technology—Coded Representation of Immersive Media—Part 5: Video-based point cloud compression", ISO/IEC DIS 23090-5, 2019, ISO/IEC JTC 1/SC 29, 186 Pages.

ISO: "Requirements for Immersive Media Access and Delivery", Jul. 2019, ISO/IEC JTC 1/SC 29/WG 11 N18654, 20 Pages.

ISO: "Working Draft of Video Decoding Interface for Immersive Media", ISO/IEC JTC 1/SC 29 WG 11 N19068, ISO/IEC CD 23090-13, Oct. 11, 2019, 23 Pages.

ISO/IEC FDIS 23009-1:2019(E): "Information technology—Dynamic Adaptive Streaming Over HTTP (DASH)—Part 1: Media Presentation Description and Segment Formats", 2019, 295 Pages.

ITU-T H.265, "Series H: Audiovisual and Multimedia Systems, Infrastructure of audiovisual services—Coding of moving video, High efficiency video coding," The International Telecommunication Union. Dec. 2016, 664 Pages.

Paila T., et al., "FLUTE—File Delivery over Unidirectional Transport", Nov. 2012, Internet Engineering Task Force, pp. 1-46.

QUALCOMM: "pCR TS26.118: Media Profiles for Video", TSG SA4 #98 Meeting, Tdoc S4-180373, Apr. 9-13, 2018, Kista, Sweden, pp. 1-2.

"International Standard, Information Technology-Coded Representation of Immersive Media—Part 2: Omnidirectional Media Format", ISO/IEC 23090-2, First Edition, Jan. 2019, 169 pages.

* cited by examiner

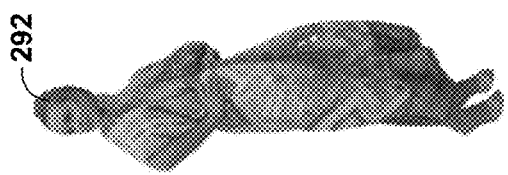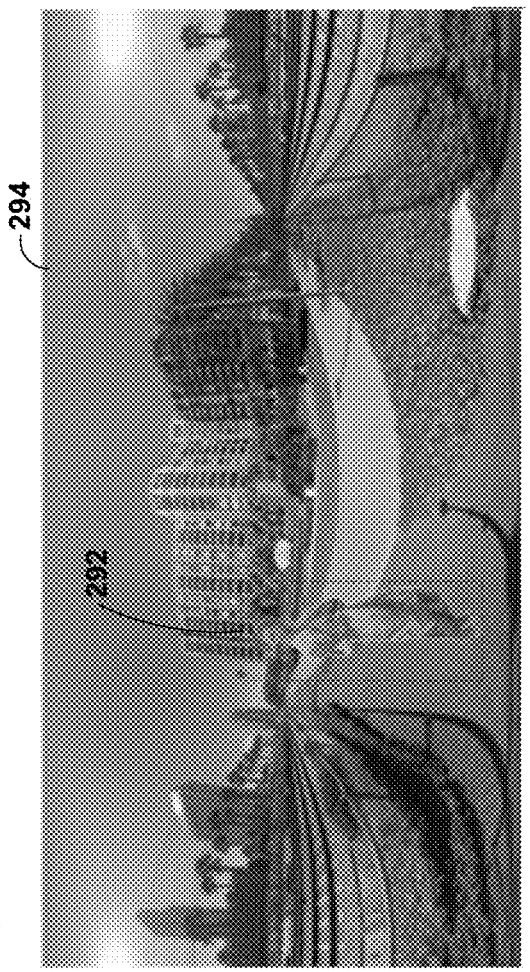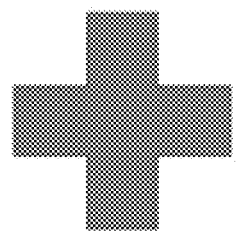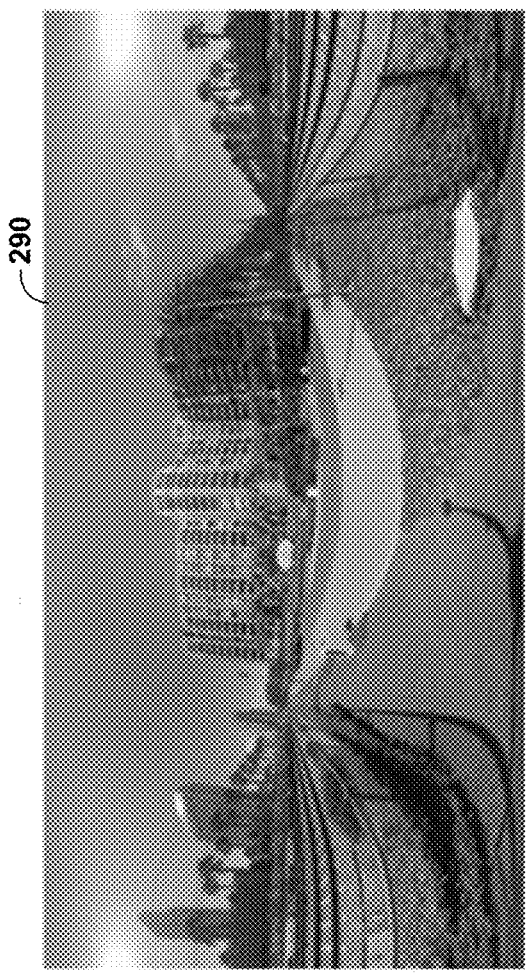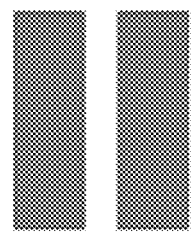
FIG. 9

MULTIPLE DECODER INTERFACE FOR STREAMED MEDIA DATA

This application claims the benefit of U.S. Provisional Application No. 62/789,940, filed Jan. 8, 2019, the entire contents of which are hereby incorporated by reference.

TECHNICAL FIELD

This disclosure relates to storage and transport of media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After media data, such as audio and video data, has been encoded, the media data may be packetized for transmission or storage. The media data may be assembled into a media file conforming to any of a variety of standards, such as the International Organization for Standardization (ISO) base media file format and extensions thereof, such as AVC.

SUMMARY

In general, this disclosure describes techniques for receiving and distributing media data of different types to different respective decoders at a client device. The media data of different types may be included in a single received file. Recently, a set of draft requirements were collected to address a set of issues developed in the context of immersive media data delivery and access. Different aspects of the requirements include a coded representation for the media data (e.g., MPEG-I), formats (which may be addressed by, e.g., mapping representations to MPEG storage and delivery functions), network-based processing, declaration of available media data, and a decoder model.

In one example, a method of retrieving media data includes determining, by a client device including a plurality of video decoders, a complexity value for media data including a plurality of encoded video streams, the complexity value representing complexity of an aggregation of the encoded video streams; retrieving, by the client device, the media data including the encoded video streams in response to determining that the client device is capable of decoding the encoded video streams using the complexity value; and distributing, by the client device, the encoded video streams and synchronization information to corresponding video decoders of the plurality of video decoders to cause the video decoders to decode the corresponding video streams and to output decoded video data from the video streams in a synchronized fashion.

In another example, a client device for retrieving media data includes a memory configured to store media data; and one or more processors implemented in circuitry and configured to execute a plurality of video decoders; determine a complexity value for the media data including a plurality of encoded video streams, the complexity value representing complexity of an aggregation of the encoded video streams; retrieve the media data including the encoded video streams in response to determining that the client device is capable of decoding the encoded video streams using the complexity value; and distribute the encoded video streams and synchronization information to corresponding video decoders of the plurality of video decoders to cause the video decoders to decode the corresponding video streams and to output decoded video data from the video streams in a synchronized fashion.

In another example, a computer-readable storage medium has stored thereon instructions that, when executed, cause a processor to: execute a plurality of video decoders; determine a complexity value for the media data including a plurality of encoded video streams, the complexity value representing complexity of an aggregation of the encoded video streams; retrieve the media data including the encoded video streams in response to determining that the client device is capable of decoding the encoded video streams using the complexity value; and distribute the encoded video streams and synchronization information to corresponding video decoders of the plurality of video decoders to cause the video decoders to decode the corresponding video streams and to output decoded video data from the video streams in a synchronized fashion.

In another example, a client device for retrieving media data includes a plurality of video decoders; means for determining a complexity value for media data including a plurality of encoded video streams, the complexity value representing complexity of an aggregation of the encoded video streams; means for retrieving the media data including the encoded video streams in response to determining that the client device is capable of decoding the encoded video streams using the complexity value; and means for distributing the encoded video streams and synchronization information to corresponding video decoders of the plurality of video decoders to cause the video decoders to decode the corresponding video streams and to output decoded video data from the video streams in a synchronized fashion.

The details of one or more examples are set forth in the accompanying drawings and the description below. Other features, objects, and advantages will be apparent from the description and drawings, and from the claims.

BRIEF DESCRIPTION OF DRAWINGS

FIG. 9 is a conceptual diagram illustrating an example in which a Point Cloud Object is combined with a scene with a 360 background.

DETAILED DESCRIPTION

Figure 1:
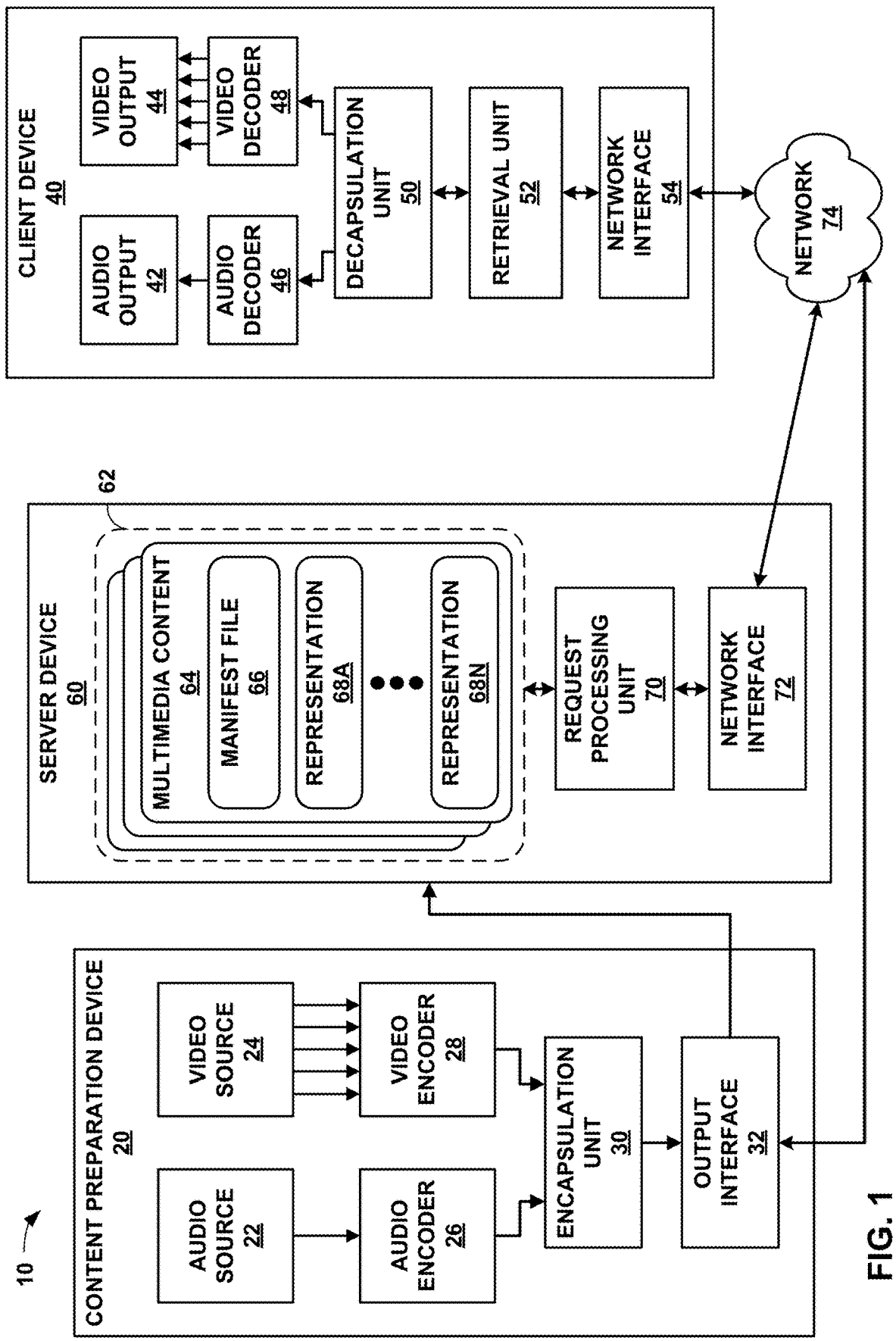
FIG. 1 is a block diagram illustrating an example system that implements techniques for streaming media data over a network.

In some media applications, media scenes are composed of multiple videos. Such videos may be postprocessed and then rendered jointly. For example, they may be stitched, overlaid, or a scene composition creates an immersive experience. This disclosure describes techniques that may be applied to bitstreams including immersive media data (e.g., audio and video data).

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes corresponds to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Although only a single video decoder 48 is shown in the example of FIG. 1, as discussed in greater detail below (e.g., with respect to FIG. 11), client device 40 may be configured to include a plurality of video decoders. In addition, decapsulation unit 50 may be configured to include a demultiplexer that demultiplexes a plurality of encoded video bitstreams (e.g., for different tiles of cube mapped video data) and that directs the encoded video bitstreams to different video decoders. Decapsulation unit 50 may include an interface, such as an application programming interface (API) that directs video data of the various video bitstreams to corresponding video decoders. Additionally, client device 40 may include a synchronization unit that temporally synchronizes decoded video data (e.g., pictures) from the plurality of video decoders, as well as audio data decoded by audio decoder 46.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
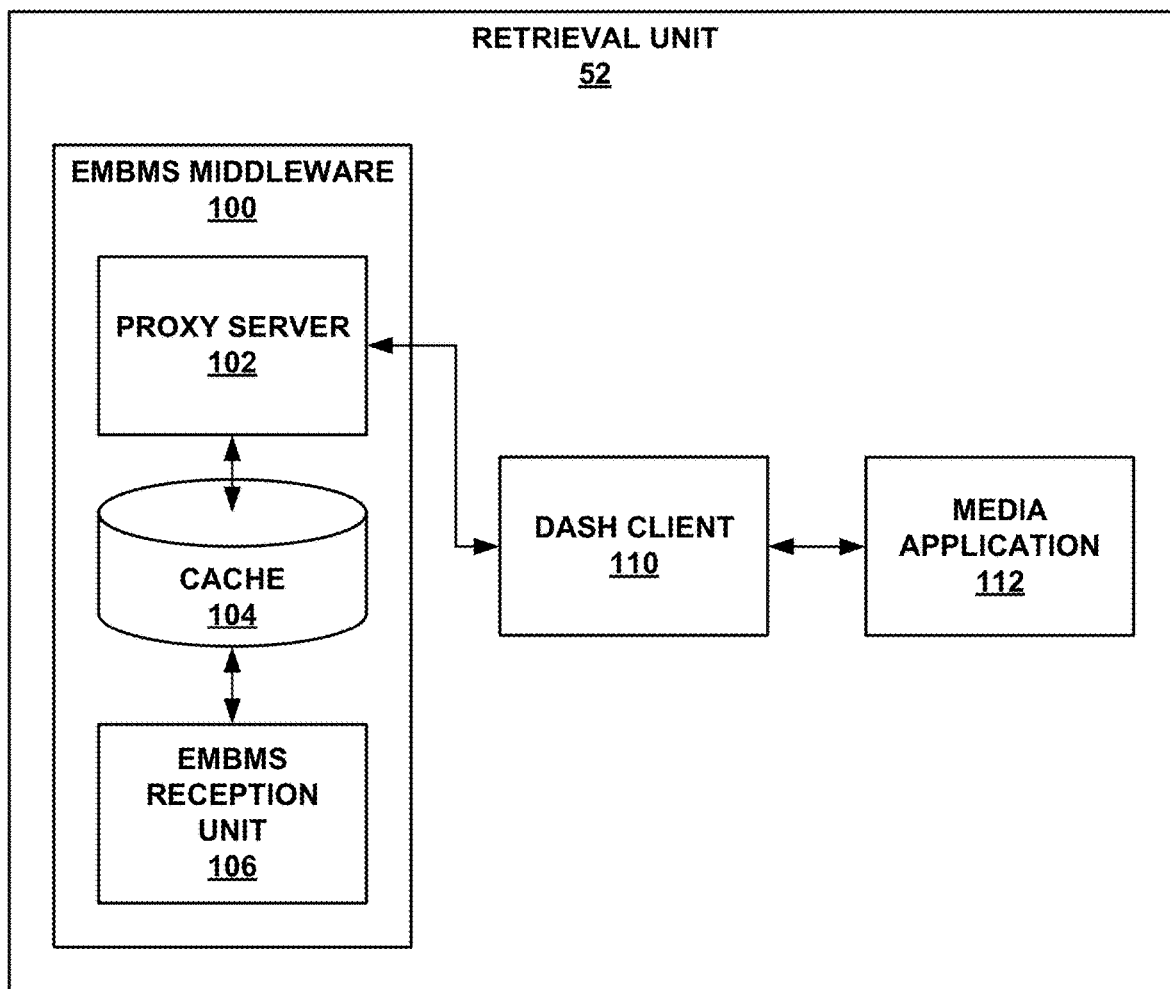
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
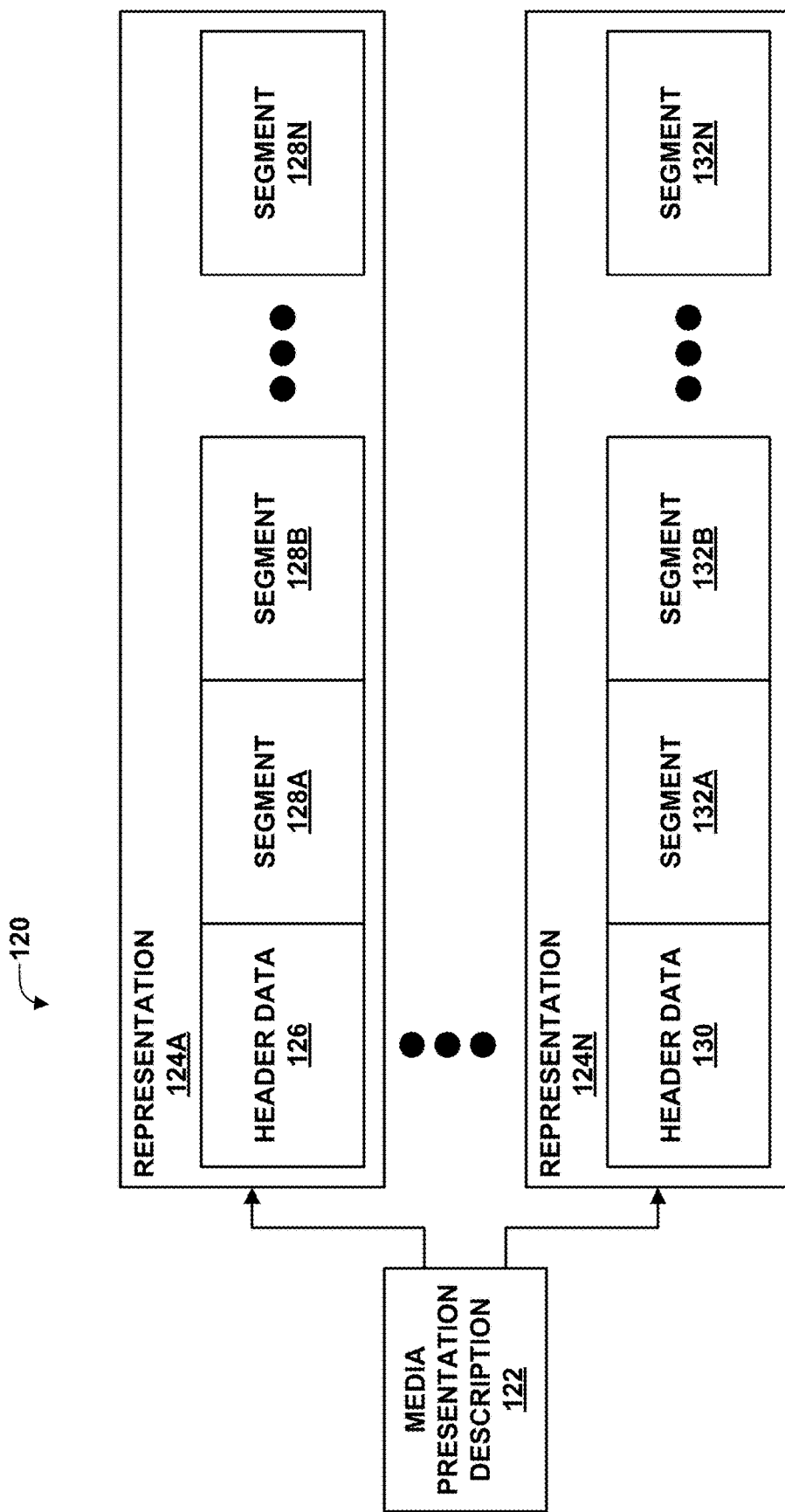
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 may include data representing a complexity of a media file, e.g., a maximum number of video blocks to be processed per second, a maximum number of pixels to be processed per second, a maximum number of decoder instances, and/or a maximum number of concurrent decoder instances. In some examples, the complexity may be represented by a video profile, tier, and/or level value. In some examples, the profile, tier, and/or level value may be signaled (additionally or alternatively) in a parameter set, such as a video parameter set (VPS), a sequence parameter set (SPS), or a picture parameter set (PPS). That is, content preparation device 20 of FIG. 1 may construct MPD 122 (or manifest file 66 of FIG. 1) to indicate values for profile, tier, and/or level information for a corresponding bitstream.

Figure 4:
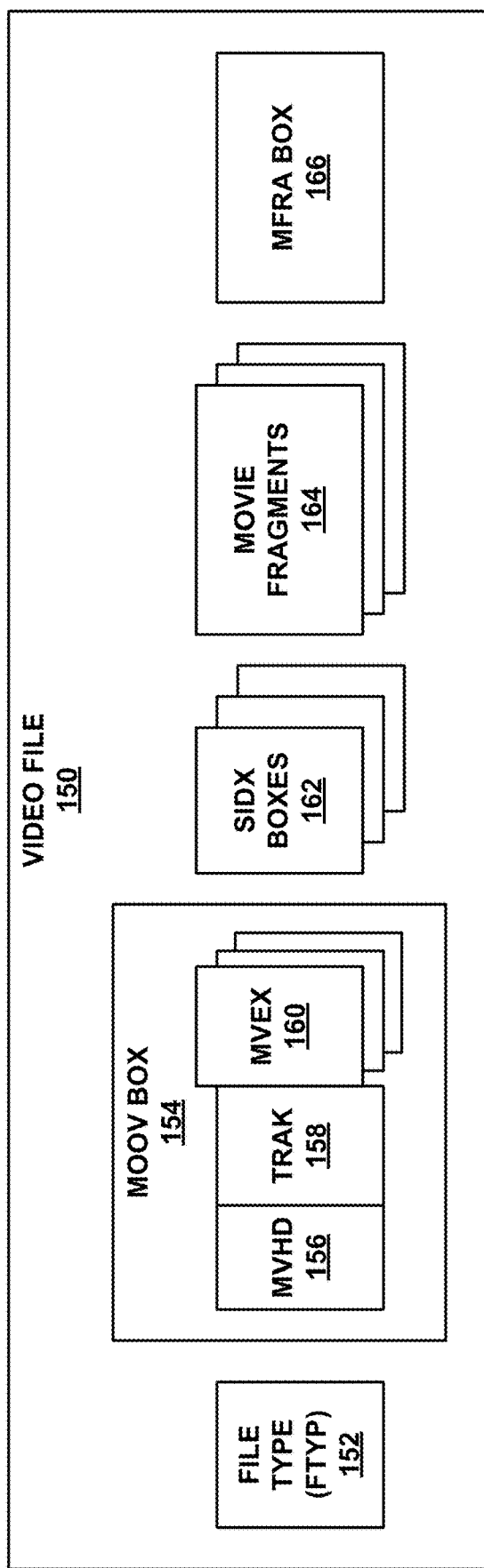
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
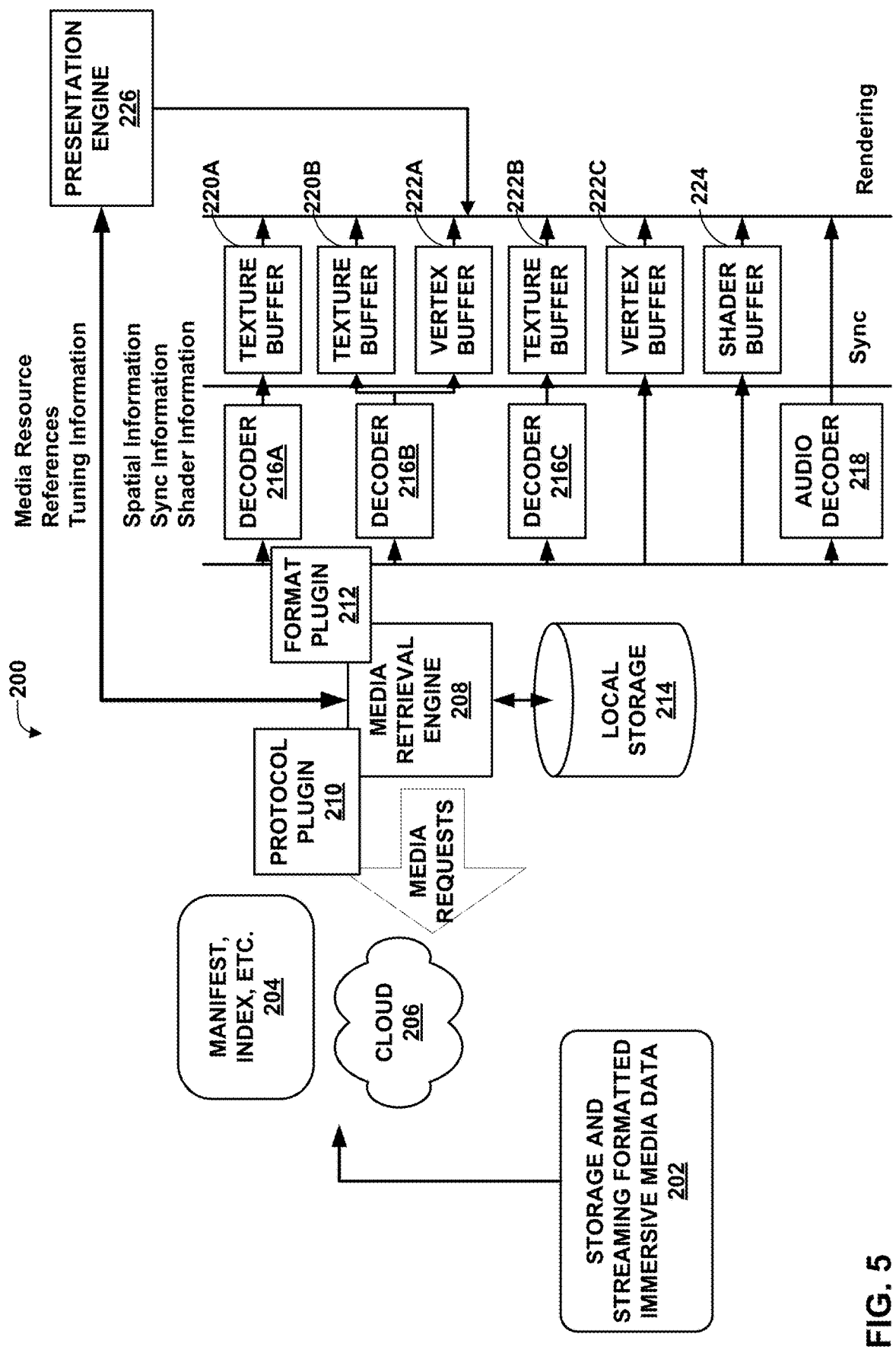
FIG. 5 is a block diagram illustrating an example system including various elements for streaming, decoding, and presenting media data.

FIG. 5 is a block diagram illustrating an example system 200 including various elements for streaming, decoding, and presenting media data. In particular, system 200 includes media retrieval engine 208, local storage 214, video decoders 216A-216C (video decoders 216), audio decoder 218, texture buffers 220A, 220B (texture buffers 220), vertex buffers 222A-222C (vertex buffers 222), shader buffer 224, and presentation engine 226. Media retrieval engine 208 includes protocol plugin 210 and format plugin 212.

In general, media retrieval engine 208 collects multiple videos from cloud server 206 and delivers these videos to individual video decoders 216. Initially, storage and streaming formatted immersive media data 202 and metadata such as manifest, index, etc. data 204 is provided to cloud server 206. Video decoders 216 run independently, but their texture or vertex output is provided jointly to presentation engine 226 via respective texture buffers 220, vertex buffers 222, and shader buffer 224. Presentation engine 226 uses the decoder outputs and, through postprocessing, converts the videos into an appropriate scene. The number of decoders may change dynamically based on information generated by system 200. For example, a different pose from a pose tracker (not shown) may result in a different set of video streams that need to be decoded. In other cases, only the information in a user's field-of-view is decoded and rendered in higher-resolution, whereas other information is only rendered in lower-quality. This may be achieved by using multiple decoders, for example one for each cube-map face.

Figure 6:
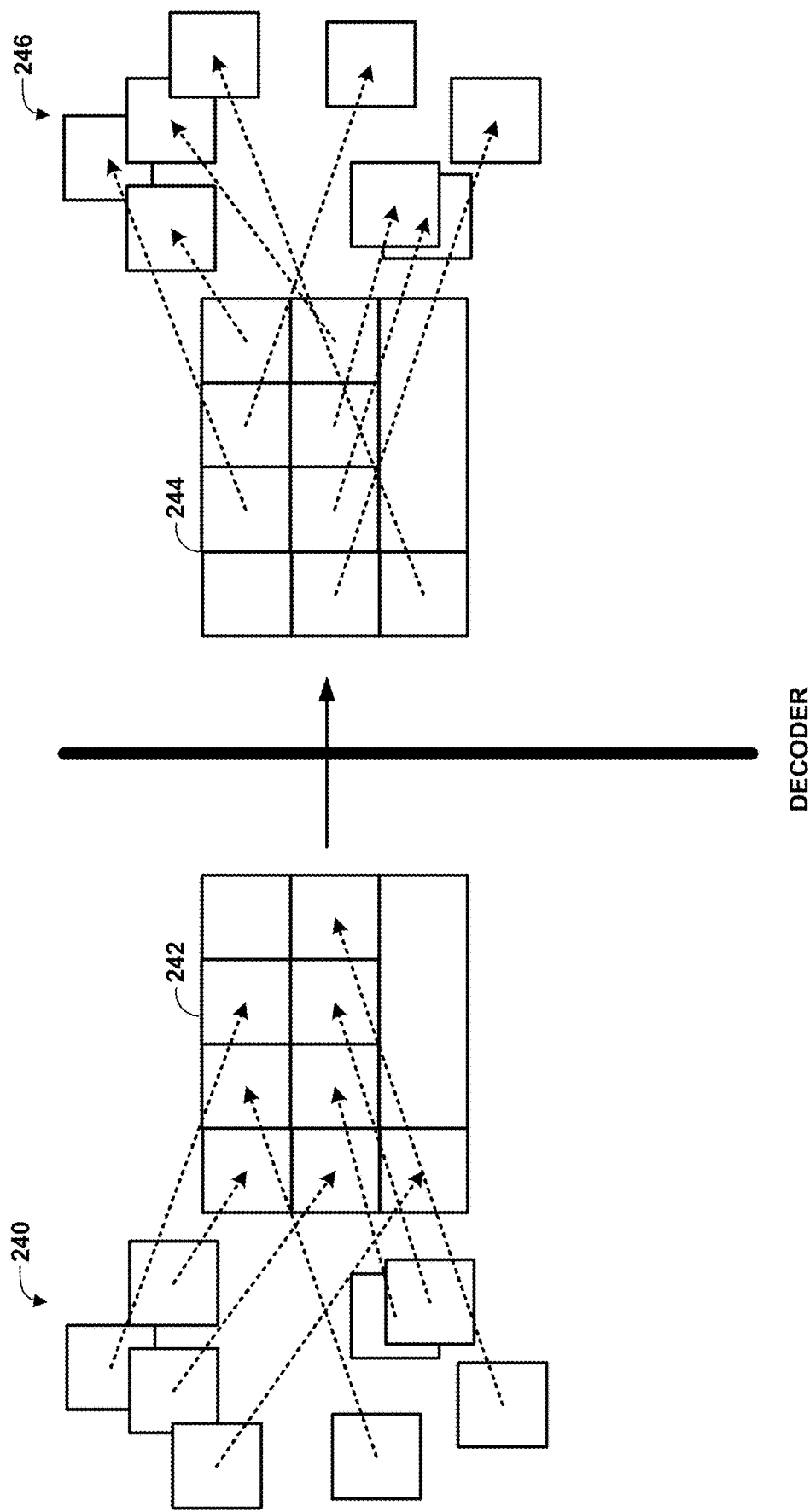
FIG. 6 is a conceptual diagram illustrating an example in which a single decoder decodes all video data of a bitstream.

FIG. 6 is a conceptual diagram illustrating an example in which a single decoder decodes all video data of a bitstream. In particular, tiles 240 represent various sets of video data, which are assembled into one raw frame 242. Raw frame 242 is encoded, transmitted, and subsequently decoded to generate decoded frame 244. Decoded frame 244 is then disassembled to generate output frames 246.

Some implementations, such as those defined in ISO/IEC 23090-2 (OMAF) or in TS26.118 for the Advanced Video Media Profile, use a tile-based approach. In FIG. 6, different video streams are prepared under very restrictive conditions using the same codec and the same type of video signals, and preparation needs to be done in a highly-coordinated manner. The decoder combines the streams by rewriting the bitstream to generate a conforming HEVC bitstream for each frame. Each of tiles 240 is mapped to a specific region in raw frame 242. Each of tiles 240 represents a region of the HEVC video stream. Region-wise packing information is added that assigns each of tiles 240 to a specific input video. A post-processing entity decomposes the output, decoded frame 244 into multiple individual tiles 246 that are each accessible individually. Also, if the video needs to be DRM protected, and encryption is applied, many restrictions apply as typically the video bitstream is encrypted as a whole.

Figure 7:
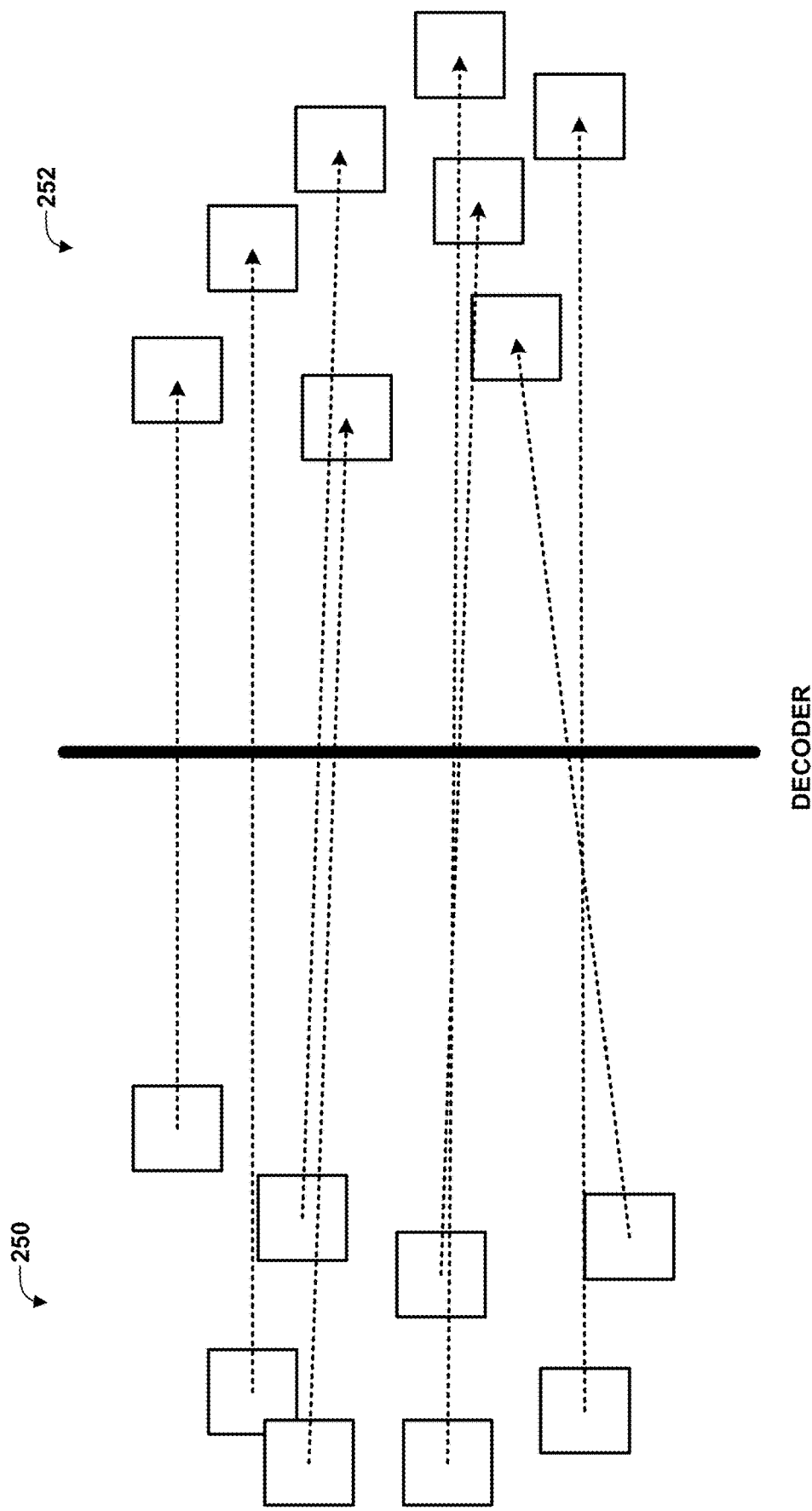
FIG. 7 is a conceptual diagram illustrating an approach consistent with the techniques of this disclosure.

FIG. 7 is a conceptual diagram illustrating an approach consistent with the techniques of this disclosure. A preferable solution to the issues noted in this disclosure is to handle each of video streams 250 by a separate, respective decoder, as shown in FIG. 7. In this case, a receiver application can use multiple decoders concurrently. Certain System-on-Chip (SoCs) platforms support multiple decoders, so in general, this is not a problem. The decoders may decode video streams 250 to produce output video data 252. As an example, if a web page with multiple independent video streams needs to be rendered, such an approach can be easily used.

However, the immersive scenario creates additional challenges that are partially solved by the tiling approach. For example, multiple decoder outputs need to be synchronized with each other. Decoders need to be dynamically established and torn down. The overall decoder complexity needs to be bounded. And the decryption framework needs to be in place to enable decryption of individual tiles.

If the tiling approach is used, yet another set of challenges needs to be addressed. For instance, the framework is specific for HEVC. A single conforming HEVC stream needs to be generated at the receiver, which may result in significant bitstream rewriting. Each video needs to have the same properties in terms of frame rate, color space, etc. Dynamically changing configurations requires instantaneous decoder refresh (IDR) frames for each video stream.

Figure 8:
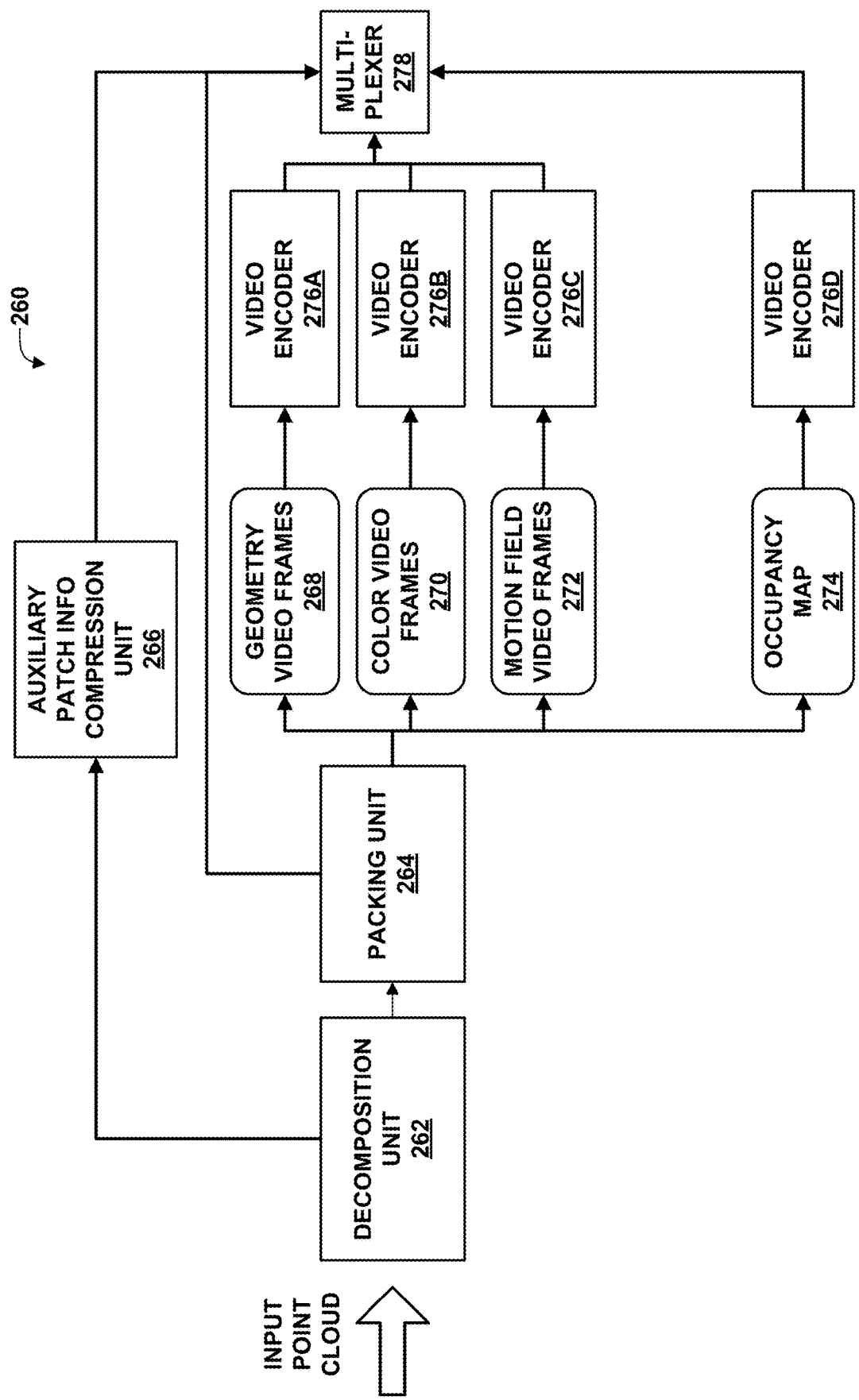
FIG. 8 is a conceptual diagram illustrating an example of usage of multiple decoders from a Point Cloud Coding approach as being prepared by MPEG in the context of ISO/IEC 23090-5.

FIG. 8 is a conceptual diagram illustrating an example system 260 that uses multiple video encoders 276A-276D (video encoders 276) from a Point Cloud Coding approach as being prepared by MPEG in the context of ISO/IEC 23090-5. In this case, different components of the point cloud video are each represented by an individual video stream, and each of the components is individually encoded (and subsequently decoded). This also requires multiple independent video decoders that are synchronized.

In particular, in FIG. 8, system 260 includes decomposition unit 262, packing unit 264, auxiliary patch information (info) compression unit 266, video encoders 276, and multiplexer 278. Decomposition unit 262 receives an input point cloud and decomposes the input point cloud into separate, respective video streams. Packing unit 264 packs the decomposed video data into various types of video data, such as geometry video frames 268, color video frames 270, motion field video frames 272, and occupancy map 274. Each of geometry video frames 268, color video frames 270, motion field video frames 272, and occupancy map 274 is encoded by a respective one of video encoders 276. Multiplexer 278 then multiplexes the encoded video streams together, along with compressed auxiliary patch information.

FIG. 9 is a conceptual diagram illustrating an example in which a Point Cloud Object 292 is combined with scene 290 with a 360 background. In particular, combining scene 290 with Point Cloud Object 292 results in scene 294, which shows how Point Cloud Object 294 has been positioned within scene 290.

Figure 10:
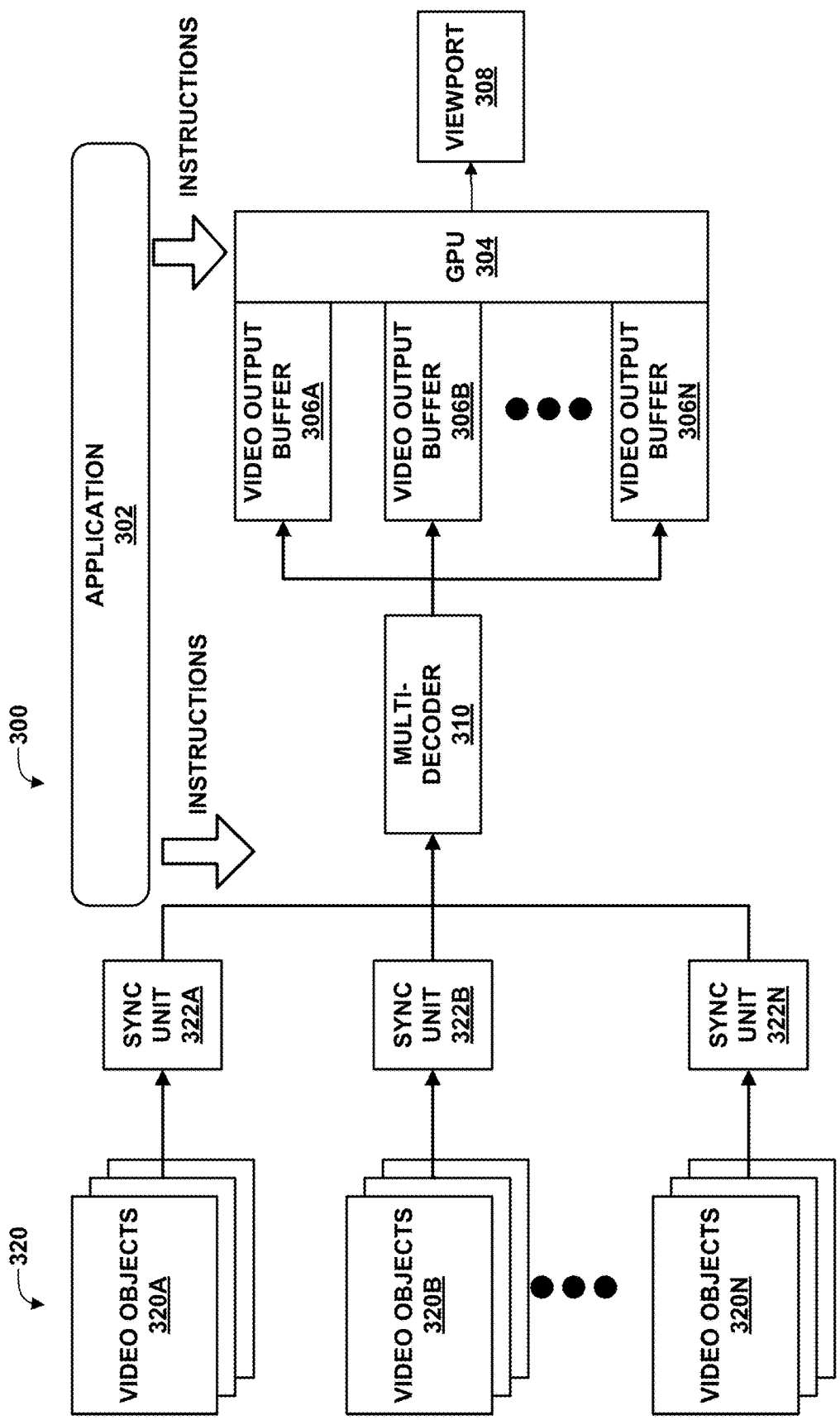
FIG. 10 is a conceptual diagram illustrating an example system for decoding streamed media data.

FIG. 10 is a conceptual diagram illustrating an example system 300 for decoding streamed media data. System 300 includes application 302, multi-decoder 310, graphics processing unit (GPU) 304, video output buffers 306A-306N (video output buffers 306), and viewport 308.

In general, system 300 dynamically uses pose information of a user and possibly other interactive data to combine a scene for proper rendering. In particular, system 300 may use pose information to select, from among various video objects 320A-320N (video objects 320), respective video streams to be retrieved. In particular, system 300 retrieves synchronization units 322A-322N (sync units 322) from respective video objects 320 according to, e.g., the pose information. For instance, system 300 may retrieve a relatively high-quality video stream for a portion of viewport 308 at which a user is looking directly, and a relatively low-quality video stream for a portion of viewport 308 that the user cannot see or is at the periphery of the user's perspective. Each of video objects 320 may have different qualities (e.g., different resolutions) available for retrieval. For example, higher resolution decoding may be applied in the field-of-view, whereas background information may be decoded in lower quality.

In general, sync units 322 each include a respective set of pictures that is to be rendered or assembled at the same (or substantially the same) time. Thus, by retrieving respective sync units 322, system 300 can ensure that the retrieved sync units are decoded, rendered, and/or assembled in a synchronous manner.

System 300 may be configured to dynamically use available streaming/network access bitrate as well as available decoding resources of multi-decoder 310 to maximize user experience. Hence, system 300 may dynamically use the available network and hardware decoding resources to adapt to the network conditions, as well as to user feedback. One issue is that application 302 may provide a well-defined interface in order to use the hardware decoding resources.

Video objects 320 available in different qualities or bitrates may be decoded by a single decoder instance. Video objects 320 may share resources dynamically, depending on the situation. Multi-decoder 310 may output each of video objects 320 to an individual, respective one of video output buffers 306 that can be referenced by application 302, for example, to support GPU-based modification for rendering. System 300 may synchronize the output data accordingly, for example, by providing sync units 322 to multi-decoder 310. The techniques of this disclosure may provide a well-defined multi-decoder interface/API (application programming interface) and a proper ability to reference the output of each of the decoders by a follow-up rendering unit (e.g., part of GPU 304 or separate from GPU 304). By doing so, the available hardware resources can be used efficiently. The decoder interface may be codec-agnostic and may even use different codecs within a decoding session, e.g. AVC, HEVC, and/or AV1.

In this manner, system 300 of FIG. 10 represents an example of a client device for retrieving media data that includes a memory configured to store media data; and one or more processors implemented in circuitry and configured to execute a plurality of video decoders; determine a complexity value for the media data including a plurality of encoded video streams, the complexity value representing complexity of an aggregation of the encoded video streams; retrieve the media data including the encoded video streams in response to determining that the client device is capable of decoding the encoded video streams using the complexity value; and distribute the encoded video streams and synchronization information to corresponding video decoders of the plurality of video decoders to cause the video decoders to decode the corresponding video streams and to output decoded video data from the video streams in a synchronized fashion.

Figure 11:
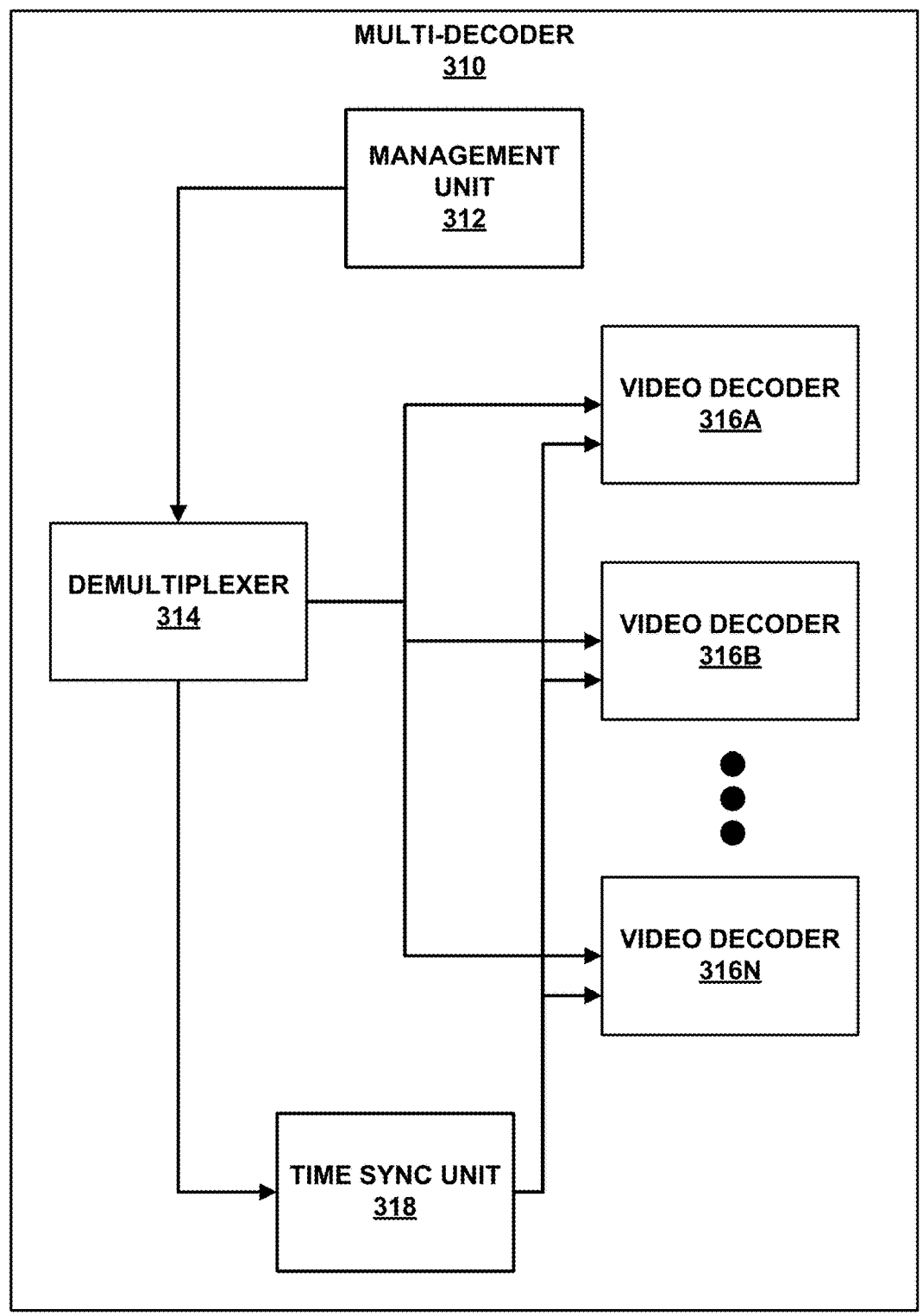
FIG. 11 is a block diagram illustrating an example multi-decoder for performing techniques of this disclosure.

FIG. 11 is a block diagram illustrating an example multi-decoder 310 for performing techniques of this disclosure. In particular, multi-decoder 310 of FIG. 11 includes management unit 312, demultiplexer 314, video decoders 316A-316N (video decoders 316), and time synchronization (sync) unit 318. Multi-decoder 310 of FIG. 11 may also include a bitstream interface (such as a bitstream API) that allows an application (e.g., application 302 of FIG. 10) to feed media units into a decoding platform and address the requirements discussed above. The basic principles of the interface/ interoperability points/API of these techniques are described below. The system of FIG. 1 may be configured to include a multi-decoder according to the model of FIG. 11, e.g., to include a plurality of video decoders and a demultiplexer that distributes various video streams to the video decoders.

An overall multi-decoder maximum complexity requirement may be initialized. Examples include one or a combination of the following: maximum number of blocks (e.g., macroblocks, coding units (CUs), largest coding units (LCUs), coding tree blocks (CTBs), or the like) per second, maximum number of pixels per second, maximum number of decoder instances, maximum number of concurrent decoder instances, and/or a profile/level/tier indication that summarizes the requirements above.

When using multi-decoder resources, multi-decoder 310 of FIG. 11 may dynamically initialize and stop individual "decoder sessions" of video decoders 316, or change the parameters of a session. Initialization may include typical decoder initialization (profile, level, output format, etc.) Parameter changes may include the currently required resources for one or more of video decoders 316 (for example, using a different level, changing the required decoded picture buffer requirements, etc.) Application 302 using multi-decoder 310 may ensure that the sum of complexities for decoder sessions of each of video decoders 316 does not exceed the limits. There may be a well-defined API to reject/notify such settings, to be on the safe side. This would be more an API call/notification, rather than a bitstream syntax.

Each decoding session may create a conforming decoder bitstream against what was initialized. Each decoding session may be clearly and uniquely identified in the bitstream/ API. The bitstreams/sessions may be independent, i.e., not share any reference buffers, etc. Extensions to, for example, scalable codecs may be considered. Each decoding session may run its own decryption context.

Across the session, application 302 can determine groups of sync units 322, corresponding to sets of pictures that are to be rendered and/or assembled at the same time to enable full synchronization. Sync units 322 may also support the presentation order output of all decoders across the sessions, access each decoder output independently for rendering (for example, GPU instructions/shaders can be bound to an output), and create a Hypothetical Decoder Model across the different decoder sessions provided by video decoders 316.

Communication to and from application 302 may be done by a binary API/interface (very similar to a single decoder interface), but a wrapper can be used for different codecs, i.e., may be codec independent. Any other API may be used as well, if implementation proves to be simplified. The API may be provided by management unit 312. The video codec level wrapping may be supported by an appropriate file format, common media application format (CMAF), and/or DASH functionalities. Also, a mapping to HTML-5 media elements and MSE may be used.

The signaling on the system level may enable proper dynamic changes of the multi-decoder implementation. For example, the complexity of the decodable units may be described accordingly, in order for application 302 to schedule the decoding resources. If proven simple enough, the decoding platform may also dynamically provide information on the currently available decoding resources.

FIG. 11 illustrates an example of a setup for such a multi-decoder interface. A multiplexed bitstream is provided to demultiplexer 314, which distributes data units to individual video decoders 316, management unit 312, and/or time sync unit 318.

Data units may be targeted to management unit 312, time sync unit 318, or individual video decoders 316. The identification of the byte stream units to specific video decoders 316 may either be done through an encapsulation/wrapper layer or by providing individual bindings to the respective video decoders 316. The byte stream units may contain presentation synchronization information. Management unit 312 may provide targeted to video decoders 316 and also may be clearly identified. In addition, on a system level, each of the streams and decodable units may include a complexity annotation that allows application 302 to properly use the available decoding resources.

Management unit 312 of multi-decoder 310 of FIG. 11 may provide the following management functionalities: ability to establish an overall multi-decoder resource allocation, ability to terminate the multi-decoder session, ability to establish a new individual one of video decoders 316, ability to tear down an individual one of video decoders 316, and/or ability to change the parameter settings of an individual one of video decoders 316.

Time sync unit 318 of multi-decoder 310 of FIG. 11 may provide the following time sync functionalities: ability to mark decoded frames across different decoder instances to share the same timeline, and ability to provide timing information of each of video decoders 316.

Figure 12:
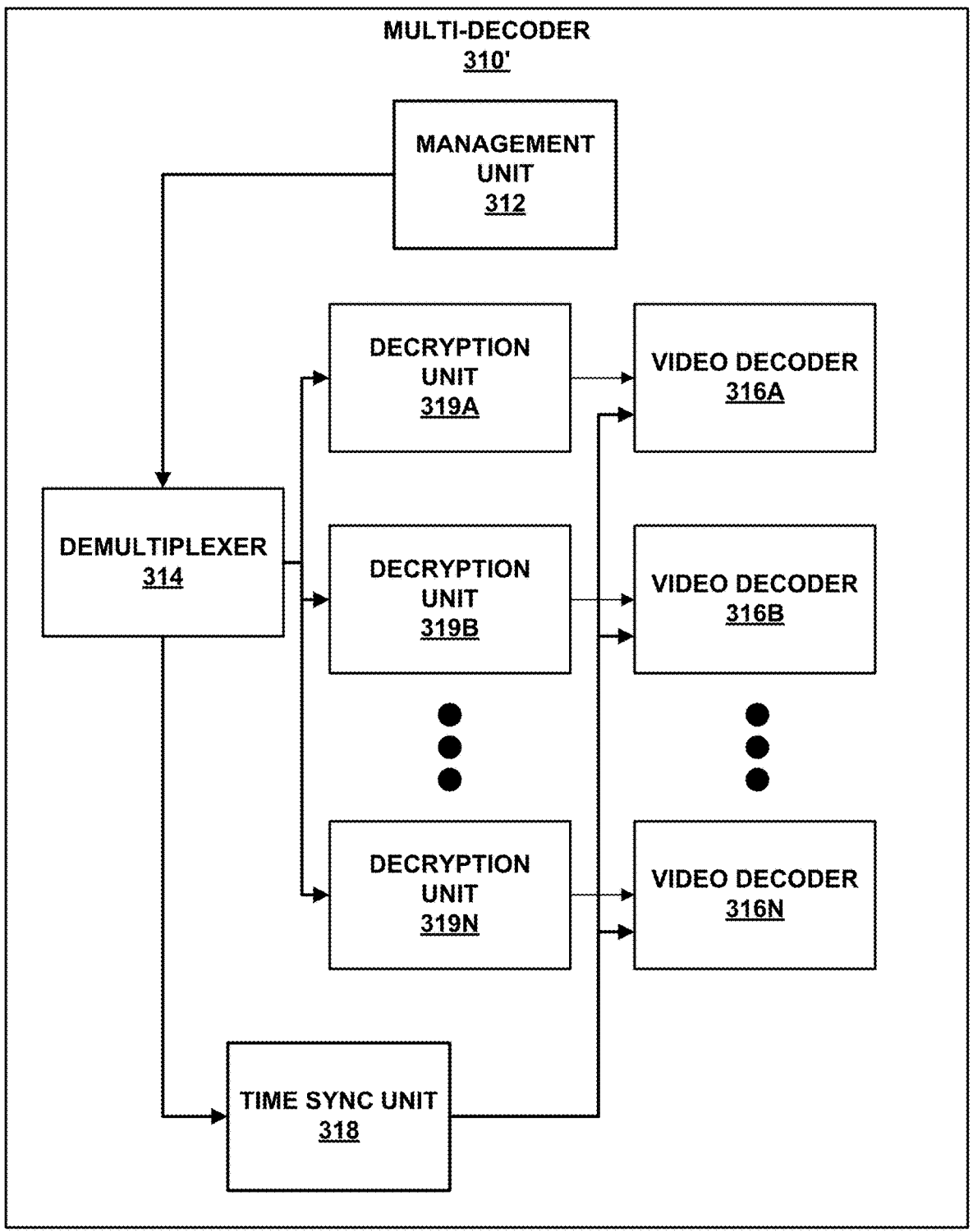
FIG. 12 is a block diagram illustrating an example multi-decoder forming part of a secure pipeline for performing techniques of this disclosure.

FIG. 12 is a block diagram illustrating an example multi-decoder 310' forming part of a secure pipeline for performing techniques of this disclosure. In general, multi-decode 310' includes the same elements as multi-decoder 310 of FIG. 11, with the addition of decryption units 319A-319N (decryption units 319) for each of video decoders 316. If security is involved, then it is assumed that the management and decoding also includes the decryption. Decoded texture buffers may be maintained in the secure domain, and GPU instructions may only modify the texture output buffers, as shown in FIG. 12. Decryption units 319 each provide respective decryption environments for decrypting encrypted video streams for respective video decoders 316.

The following terminology may be used in conjunction with the techniques of this disclosure. Multi-Video-Decoder (MVD): a function that fulfills the task of decoding multiple independent video streams provided in a single bitstream, and each decoded signal is accessible independently. MVD-Interface: a binary serial bitstream interface that provides instructions to an MVD for decoding multiple parallel video streams. MVD-API: an API definition that may be used to interface with an MVD to decode multiple video streams and manage the MVD, possibly providing callback from the MVD to the application.

In this manner, a video decoding interface according to the techniques of this disclosure may support the decoding of several video objects of different natures (e.g., a tiled 360 video or a video-based point cloud). The several video elements may be independently produced. The two objects may have different temporal resolutions. The videos may be temporally synchronized after being decoded by the respective decoder.

The MVD-Interface may provide a full subset of the functionalities of the MVD-API. The MVD-Interface (and hence the MVD-API) may fulfill the following functionalities: each video stream may have its own encoding parameters in terms of codec/profile/tier/level, HRD, and the like; and each video stream may be independently generated.

Figure 13:
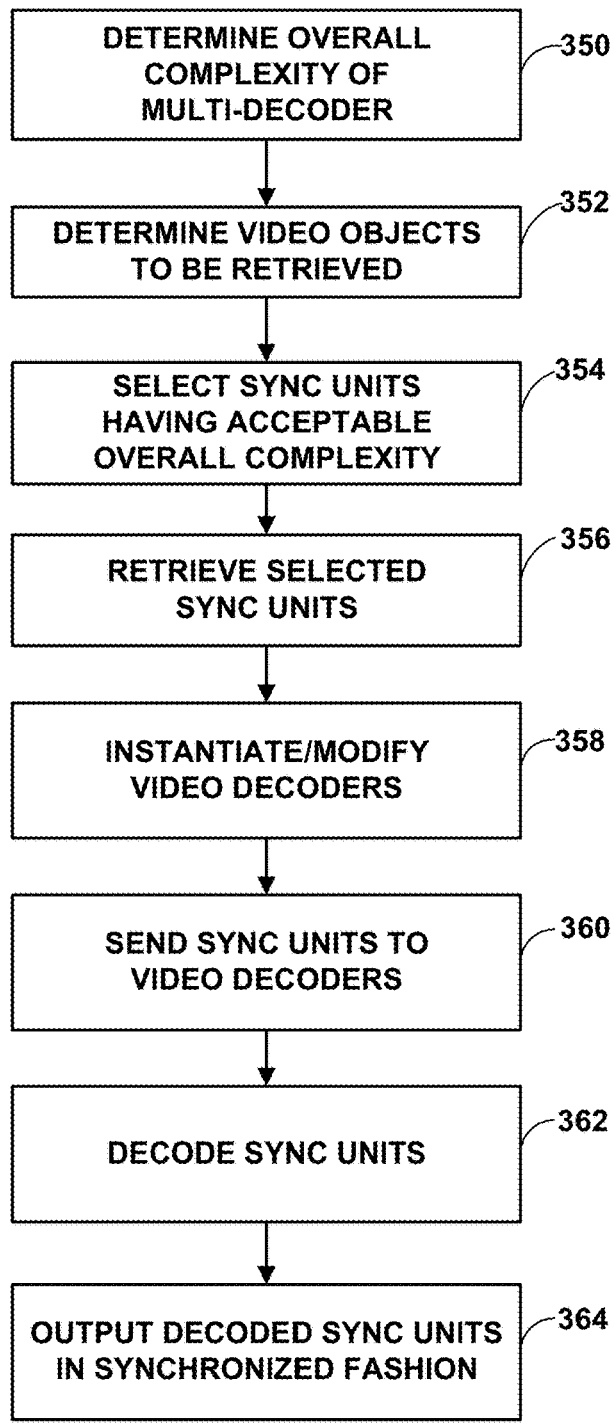
FIG. 13 is a flowchart illustrating an example method of retrieving media data according to the techniques of this disclosure.

FIG. 13 is a flowchart illustrating an example method of retrieving media data according to the techniques of this disclosure. The method of FIG. 13 may be performed by, for example, system 300 of FIG. 10, and in particular, by multi-decoder 310 of FIGS. 10 and 11 or multi-decoder 310' of FIG. 12. Likewise, this or a similar method may be performed by client device 40 of FIG. 1. For purposes of example and explanation, the method of FIG. 13 is explained with respect to system 300 of FIG. 10.

Initially, system 300 may determine an overall complexity of multi-decoder 310 (350). The overall complexity may represent, for example, one or more of a maximum number of blocks that multi-decoder 310 can process per second, a maximum number of pixels that multi-decoder 310 can process per second, a maximum number of decoder instances that multi-decoder 310 can support, and/or a maximum number of concurrent decoder instances that multi-decoder 310 can support. Additionally or alternatively, the overall complexity may represent profile, tier, and/or level information of respective video streams to be decoded.

System 300 may then determine video objects to be retrieved (352). For example, system 300 may determine a position and orientation of a headset worn by a user, and determine relative quality levels of video data to be retrieved for the various video objects. System 300 may then select synchronization (sync) units of the various video objects such that a combination of the sync units has an acceptable overall complexity (354), i.e., an overall complexity that is less than or equal to the overall complexity that can be decoded by multi-decoder 310. The sync units may each be sets of pictures from the various video objects (video streams) that are to be rendered and/or assembled synchronously, e.g., at substantially the same time. In this manner, system 300 may determine a complexity value for media data including a plurality of encoded video streams, the complexity value representing complexity of an aggregation of the encoded video streams.

System 300 may then retrieve the selected sync units (356). In this manner, system 300 may retrieve media data including encoded video streams in response to determining that the client device is capable of decoding the encoded video streams using the complexity value.

If necessary, system 300 may instantiate new video decoders, terminate currently instantiated video decoders, and/or modify parameters of currently instantiated video decoders (358). For example, system 300 may change allocated resources for the instantiated video decoders, and/or modify a profile, tier, or level of an instantiated video decoder.

As noted above, each of video decoders 316 of multi-decoder 310 (FIGS. 11 and 12) may perform a respective decoding session. In some examples, each of the media streams may be associated with a respective unique identifier. Demultiplexer 314 may encapsulate media data to be distributed to video decoders 316 with metadata that may include the respective unique identifier. Demultiplexer 314 may demultiplex a retrieved video stream into respective sets of video data for each of video decoders 316 and send the sets of video data (e.g., respective sync units) to video decoders 316 (360), e.g., using the respective identifiers.

Although not shown in FIG. 13, in some examples, decryption units 319 (FIG. 12) may decrypt encrypted video data prior to the video data being sent to video decoders 316. Decryption units 319 may each maintain respective decryption contexts for decrypting the sync units. Ultimately, video decoders 316 may decode the sync units (362) and output the decoded sync units in a synchronized fashion (364).

In this manner, the method of FIG. 13 represents an example of a method of retrieving media data including determining, by a client device including a plurality of video decoders, a complexity value for media data including a plurality of encoded video streams, the complexity value representing complexity of an aggregation of the encoded video streams; retrieving, by the client device, the media data including the encoded video streams in response to determining that the client device is capable of decoding the encoded video streams using the complexity value; and distributing, by the client device, the encoded video streams and synchronization information to corresponding video decoders of the plurality of video decoders to cause the video decoders to decode the corresponding video streams and to output decoded video data from the video streams in a synchronized fashion.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   determining, by a client device including a plurality of video decoders, a complexity for media data including a plurality of encoded video streams, the complexity representing complexity of an aggregation of the encoded video streams, each of the encoded video streams being independently encoded such that each of the encoded video streams is not predicted from any of the other encoded video streams and is not used for reference by any of the other encoded video streams;
   retrieving, by the client device, the media data including the encoded video streams in response to determining that the client device is capable of decoding the encoded video streams using the complexity; and
   distributing, by the client device, the encoded video streams and synchronization information to corresponding video decoders of the plurality of video decoders to cause the video decoders to decode the corresponding video streams and to output decoded video data from the video streams in a synchronized fashion.

2. The method of claim 1, wherein retrieving the media data comprises retrieving one or more files comprising the plurality of encoded video streams.

3. The method of claim 1, wherein distributing the encoded video streams comprises:
   sending a first synchronization (sync) unit comprising a first set of pictures of a first encoded video stream of the plurality of encoded video streams to a first video decoder of the plurality of video decoders; and
   sending a second sync unit comprising a second set of pictures of a second encoded video stream of the plurality of encoded video streams to a second video decoder of the plurality of video decoders, wherein the second sync unit is to be rendered or assembled at the same time as the first sync unit, and wherein sending the second sync unit comprises sending the second sync unit contemporaneously with sending the first sync unit.

4. The method of claim 1, wherein the media data further comprises an encoded audio stream, the method further comprising distributing the encoded audio stream to an audio decoder.

5. The method of claim 1, wherein the complexity represents one or more of a maximum number of blocks to be processed per second, a maximum number of pixels to be processed per second, a maximum number of decoder instances, or a maximum number of concurrent decoder instances.

6. The method of claim 1, further comprising selecting the media data from a plurality of sets of media data such that the complexity of the media data is less than or equal to a maximum complexity supported by the client device.

7. The method of claim 1, further comprising, in response to a request for a bitstream that exceeds a maximum complexity supported by the client device, issuing a rejection notification via an application programming interface (API).

8. The method of claim 1, further comprising dynamically initializing or stopping one or more of the video decoders.

9. The method of claim 8, wherein dynamically initializing one or more of the video decoders comprises initializing a video decoder using a value for a profile syntax element, a value for a level syntax element, and an output format for video data.

10. The method of claim 1, further comprising stopping and reinitializing one of the video decoders to change parameters of the reinitialized video decoder.

11. The method of claim 10, wherein stopping and reinitializing one of the video decoders comprises modifying allocated resources for the one of the video decoders.

12. The method of claim 10, wherein stopping and reinitializing the one of the video decoders comprises changing a level of a profile for the one of the video decoders or changing decoded picture buffer requirements for the one of the video decoders.

13. The method of claim 1, further comprising:
instantiating a new video decoder in addition to the plurality of video decoders to decode one of the encoded video bitstreams; and
determining a unique identifier from the media data for a decoding session performed by the new video decoder,
wherein distributing comprises distributing video data of the one of the encoded video bitstreams to the new video decoder when the one of the encoded video bitstreams includes the unique identifier.

14. The method of claim 1, further comprising, by each of the video decoders, decrypting a respective one of the encoded video streams and maintaining a respective decryption context.

15. A client device for retrieving media data, the client device comprising:
a memory configured to store media data; and
one or more processors implemented in circuitry and configured to:
execute a plurality of video decoders;
determine a complexity for the media data including a plurality of encoded video streams, the complexity representing complexity of an aggregation of the encoded video streams, each of the encoded video streams being independently encoded such that each of the encoded video streams is not predicted from any of the other encoded video streams and is not used for reference by any of the other encoded video streams;
retrieve the media data including the encoded video streams in response to determining that the client device is capable of decoding the encoded video streams using the complexity; and
distribute the encoded video streams and synchronization information to corresponding video decoders of the plurality of video decoders to cause the video decoders to decode the corresponding video streams and to output decoded video data from the video streams in a synchronized fashion.

16. The client device of claim 15, wherein to distribute the encoded video streams, the one or more processors are configured to:
send a first synchronization (sync) unit comprising a first set of pictures of a first encoded video stream of the plurality of encoded video streams to a first video decoder of the plurality of video decoders; and
send a second sync unit comprising a second set of pictures of a second encoded video stream of the plurality of encoded video streams to a second video decoder of the plurality of video decoders, wherein the second sync unit is to be rendered or assembled at the same time as the first sync unit, and wherein sending the second sync unit comprises sending the second sync unit contemporaneously with sending the first sync unit.

17. The client device of claim 15, wherein the complexity represents one or more of a maximum number of blocks to be processed per second, a maximum number of pixels to be processed per second, a maximum number of decoder instances, or a maximum number of concurrent decoder instances.

18. The client device of claim 15, wherein the one or more processors are further configured to select the media data from a plurality of sets of media data such that the complexity of the media data is less than or equal to a maximum complexity supported by the client device.

19. The client device of claim 15, wherein the one or more processors are further configured to, in response to a request for a bitstream that exceeds a maximum complexity supported by the client device, issuing a rejection notification via an application programming interface (API).

20. The client device of claim 15, wherein the one or more processors are further configured to dynamically initialize or stop one or more of the video decoders.

21. The client device of claim 15, wherein the one or more processors are further configured to stop and reinitialize one of the video decoders to change parameters of the reinitialized video decoder.

22. The client device of claim 15, wherein the one or more processors are further configured to:
instantiate a new video decoder in addition to the plurality of video decoders to decode one of the encoded video bitstreams; and
determine a unique identifier from the media data for a decoding session performed by the new video decoder,
wherein to distribute the video data, the one or more processors are configured to distribute video data of the one of the encoded video bitstreams to the new video decoder when the one of the encoded video bitstreams includes the unique identifier.

23. The client device of claim 15, wherein the one or more processors are configured to execute the plurality of video decoders to decrypt a respective one of the encoded video streams and maintain a respective decryption context.

24. A non-transitory computer-readable storage medium having stored thereon instructions that, when executed, cause a processor to:
execute a plurality of video decoders;
determine a complexity for the media data including a plurality of encoded video streams, the complexity representing complexity of an aggregation of the encoded video streams, each of the encoded video streams being independently encoded such that each of the encoded video streams is not predicted from any of the other encoded video streams and is not used for reference by any of the other encoded video streams;

retrieve the media data including the encoded video streams in response to determining that the client device is capable of decoding the encoded video streams using the complexity; and distribute the encoded video streams and synchronization information to corresponding video decoders of the plurality of video decoders to cause the video decoders to decode the corresponding video streams and to output decoded video data from the video streams in a synchronized fashion.

25. The non-transitory computer-readable storage medium of claim 24, wherein the instructions that cause the processor to distribute the encoded video streams comprise instructions that cause the processor to:

send a first synchronization (sync) unit comprising a first set of pictures of a first encoded video stream of the plurality of encoded video streams to a first video decoder of the plurality of video decoders; and send a second sync unit comprising a second set of pictures of a second encoded video stream of the plurality of encoded video streams to a second video decoder of the plurality of video decoders, wherein the second sync unit is to be rendered or assembled at the same time as the first sync unit, and wherein sending the second sync unit comprises sending the second sync unit contemporaneously with sending the first sync unit.

26. The non-transitory computer-readable storage medium of claim 24, wherein the complexity represents one or more of a maximum number of blocks to be processed per second, a maximum number of pixels to be processed per second, a maximum number of decoder instances, or a maximum number of concurrent decoder instances.

27. The non-transitory computer-readable storage medium of claim 24, further comprising instructions that cause the processor to select the media data from a plurality of sets of media data such that the complexity of the media data is less than or equal to a maximum complexity supported by the client device.

28. The non-transitory computer-readable storage medium of claim 24, further comprising instructions that cause the processor to, in response to a request for a bitstream that exceeds a maximum complexity supported by the client device, issue a rejection notification via an application programming interface (API).

29. The non-transitory computer-readable storage medium of claim 24, further comprising instructions that cause the processor to dynamically initialize or stop one or more of the video decoders.

30. The non-transitory computer-readable storage medium of claim 24, further comprising instructions that cause the processor to stop and reinitialize one of the video decoders to change parameters of the reinitialized video decoder.

31. The non-transitory computer-readable storage medium of claim 24, further comprising instructions that cause the processor to:

instantiate a new video decoder in addition to the plurality of video decoders to decode one of the encoded video bitstreams; and determine a unique identifier from the media data for a decoding session performed by the new video decoder, wherein the instructions that cause the processor to distribute comprise instructions that cause the processor to distribute video data of the one of the encoded video bitstreams to the new video decoder when the one of the encoded video bitstreams includes the unique identifier.

32. The non-transitory computer-readable storage medium of claim 24, wherein the instructions that cause the processor to execute the plurality of video decoders comprise instructions that cause the processor to cause the video decoders to decrypt a respective one of the encoded video streams and maintain a respective decryption context.

33. A client device for retrieving media data, the client device comprising:

a plurality of video decoders;

means for determining a complexity for media data including a plurality of encoded video streams, the complexity representing complexity of an aggregation of the encoded video streams, each of the encoded video streams being independently encoded such that each of the encoded video streams is not predicted from any of the other encoded video streams and is not used for reference by any of the other encoded video streams;

means for retrieving the media data including the encoded video streams in response to determining that the client device is capable of decoding the encoded video streams using the complexity; and means for distributing the encoded video streams and synchronization information to corresponding video decoders of the plurality of video decoders to cause the video decoders to decode the corresponding video streams and to output decoded video data from the video streams in a synchronized fashion.

* * * * *